United States Patent [19]

Ohta

[11] Patent Number: 4,899,072
[45] Date of Patent: Feb. 6, 1990

[54] PULSE MOTOR

[75] Inventor: Masataka Ohta, Kamakura, Japan

[73] Assignee: Nippon Telegraph and Telephone Corporation, Tokyo, Japan

[21] Appl. No.: 205,395

[22] PCT Filed: Sep. 17, 1987

[86] PCT No.: PCT/JP87/00685

§ 371 Date: May 10, 1988

§ 102(e) Date: May 10, 1988

[87] PCT Pub. No.: WO88/02194

PCT Pub. Date: Mar. 24, 1988

[30] Foreign Application Priority Data

Sep. 20, 1986 [JP] Japan .................. 61-220969
Sep. 20, 1986 [JP] Japan .................. 61-220971

[51] Int. Cl.$^4$ ............................................ H02K 37/00
[52] U.S. Cl. ........................... 310/49 R; 310/114; 310/154; 310/156; 310/185; 310/254
[58] Field of Search ............... 310/49 R, 46, 89, 112, 310/114, 152, 154, 162, 179, 180, 208, 254, 261, 156, 40 MM, 185

[56] References Cited

U.S. PATENT DOCUMENTS

| | | | |
|---|---|---|---|
| 3,571,639 | 3/1971 | Tiltins | 310/112 |
| 4,134,054 | 1/1979 | Akamatsu | 310/112 |
| 4,206,374 | 6/1980 | Goddijn | 310/49 R |
| 4,234,808 | 11/1980 | Geppert | 310/49 R |
| 4,255,696 | 3/1980 | Field, II | 310/49 R |
| 4,306,164 | 12/1981 | Itoh et al. | |
| 4,327,299 | 4/1982 | Goddijn | 310/49 R |
| 4,330,724 | 5/1982 | Goddijn | 310/49 R |
| 4,406,958 | 9/1983 | Palermo | 310/49 R |
| 4,739,201 | 4/1988 | Brigham | 310/49 R |

FOREIGN PATENT DOCUMENTS

| | | |
|---|---|---|
| 1134150 | 8/1962 | Fed. Rep. of Germany . |
| 2147361 | 3/1972 | Fed. Rep. of Germany . |
| 2727450 | 1/1978 | Fed. Rep. of Germany . |
| 3022392 | 1/1981 | Fed. Rep. of Germany . |
| 53-47522 | 11/1978 | Japan . |

Primary Examiner—R. Skudy
Attorney, Agent, or Firm—Pollock, Vande Sande and Priddy

[57] ABSTRACT

A hybrid type pulse motor, whose thickness in a direction perpendicular to its rotary shaft is less than that of a conventional pulse motor, comprises a rotor which has teeth formed around the peripheral surface of a cylindrical rotor core of a soft magnetic substance at a fixed pitch; a stator is disposed at either side of the rotor; each stator has 2n magnetic poles, each having wound thereon a coil and facing the rotor; these magnetic poles are arranged in the order to first, second, . . . and 2n-th in the axial direction of the rotor in a plane containing its rotary shaft; the first to n-th magnetic poles are coupled together magnetically; the (n+1)th to 2n-th magnetic poles are coupled together magnetically; a permanent magnet is disposed between the n-th and (n+1)th magnetic poles; the first to 2n-th magnetic poles have teeth formed at the same angular pitch as that of the teeth of the rotor; and either the teeth of these magnetic poles or the teeth formed on 2n parts into which the rotor is divided lengthwise thereof corresponding to the magnetic poles are sequentially displaced apart by $\frac{1}{n}$ of the pitch of the teeth.

16 Claims, 5 Drawing Sheets

4,899,072

PULSE MOTOR

TECHNICAL FIELD

The present invention relates to a hybrid type pulse motor.

BACKGROUND ART

A conventional four-phase hybrid type pulse motor is shown in FIGS. 1 and 2. A rotary shaft 11 has affixed thereto a permanent magnet 12 and rotor cores 13 coupled to both ends of the magnet 12. The rotor cores 13 have teeth 14 formed around their peripheral surfaces at the same angular pitch and at the same angular positions. The rotary shaft 11, the permanent magnet 12 and the rotor cores 13 constitute a rotor 15.

Disposed about both rotor cores 13 is a cylindrical stator yoke 16, which has eight magnetic poles 17 projecting out from its interior surface at equiangular intervals in opposing relation to the peripheral surfaces of the rotor cores 13. Each magnetic pole 17 facing the rotor 15 has teeth 18 formed in its projecting end face at the same angular pitch as that of the teeth 14, and each magnetic pole 17 has wound thereon a coil 19. The stator yoke 16, the magnetic poles 17 and the coils 19 form a stator 21. The rotor 15 and the stator 21 are disposed in a housing 22, with the rotary shaft 11 rotatably supported relative to the housing 22 by means of bearings 23.

The operation of this conventional pulse motor is well-known, and hence will be described in brief.

FIG. 3 is a development elevation of the pulse motor depicted in FIGS. 1 and 2, showing mainly the south pole side of the permanent magnet 12. Greek numerals I, II, III and IV indicate the phase numbers. The teeth 18 of adjacent magnetic poles are displaced one-fourth the pitch apart. In the state depicted in FIG. 3, when current flows in the coils 19 of the magnetic poles 17 of the phase numbers I and III in the direction shown, the teeth 18 will be magnetized with polarities as shown. This causes the magnetic flux emanating from the permanent magnet 12 and the flux from the coils 19 to flow between the teeth 14 of the rotor core 13 and the teeth 18 of the stator 21 as indicated by the solid lines and the broken lines, respectively. As a result, the magnetic fluxes cancel each other in the teeth 18 of the phase number III, and hence no attractive force will be generated, while an attractive force will be produced in the teeth 18 of the phase number I in which the magnetic fluxes are added together, causing the rotor 15 to move to the right in FIG. 3 by a distance equal to a quarter of the pitch. Then, the teeth 18 with coils 19 of the phase numbers II and IV, in which no current flowed, come to bear the same positional relationships to the teeth 14 of the rotor 15 as did the teeth 18 of the phase numbers I and III before the movement of the rotor; by supplying current to the coils 19 of the phase numbers II and IV, the rotor can similarly be moved. By repeating this operation an attractive force is always produced between the teeth 18 of any one of the phase numbers and the teeth 14 of the rotor 15, causing the rotor 15 to continue rotating in one direction by steps of a distance equal to one-fourth of the pitch.

With the conventional pulse motor structure described above, the reduction of its diameter is difficult because it calls for the reduction of the diameter of the rotor 15 and/or the diameter of the stator 21, which incurs a decrease in the torque of the motor. On the other hand, reduction in the size of the motor in the axial direction of the rotary shaft 11, that is, the thinning of the motor, is relatively easy and the decrease in the torque counterbalances to the miniaturization, so that a relatively large number of such motors are now on the market. With this type of motor structure, however, since the rotary shaft 11 needs to have a certain length for mounting thereon the rotor cores and so on, miniaturization of the conventional pulse motor in which the length of the rotary shaft 11 is equal to the length of the motor in its thickwise direction (in the direction of its diameter) cannot be readily effected.

An object of the present invention is to provide a pulse motor of a shape and dimensions unachievable in the past, through reduction of its size in a direction perpendicular to the rotary shaft.

DISCLOSURE OF THE INVENTION

According to the present invention, a cylindrical rotor core of a soft magnetic substance, mounted on the rotor, has teeth formed in its peripheral surface at a fixed pitch; the stator has 2n (where n is an integer equal to or greater than 2) magnetic poles facing the peripheral surface of the rotor; each magnetic pole has wound thereon a coil; the 2n magnetic poles of the stator are fixedly arranged in the order of first, second, third, ... and 2n-th in the axial direction of the rotor in a plane containing its rotary shaft; the first to n-th magnetic poles are coupled together magnetically; the (n+1)th to 2n-th magnetic poles are similarly coupled together magnetically; a permanent magnet magnetized in the direction of the rotary shaft of the rotor is disposed at least either between the n-th and (n+1)th magnetic poles or at the center of the rotor which is divided lengthwise thereof into 2n parts corresponding to the magnetic poles of the stator, respectively; the first to 2n-th magnetic poles each have teeth formed therein at the same pitch as that of the teeth of the rotor in opposing relation thereto; and either the teeth of the magnetic poles of the stator or the teeth formed on the 2n parts of the rotor which is divided lengthwise thereof corresponding to the magnetic poles of the stator are sequentially displaced apart of $\frac{1}{2}n$ of the pitch of the teeth.

With such an arrangement as mentioned above, the height of the motor can be reduced in the direction which is perpendicular to the rotary shaft of the rotor and in which no stator is disposed, that is, the motor height can be made equal to the diameter of the rotor, and accordingly a thin pulse motor can be obtained.

BEST MODE FOR CARRYING OUT THE INVENTION

Figure 4:
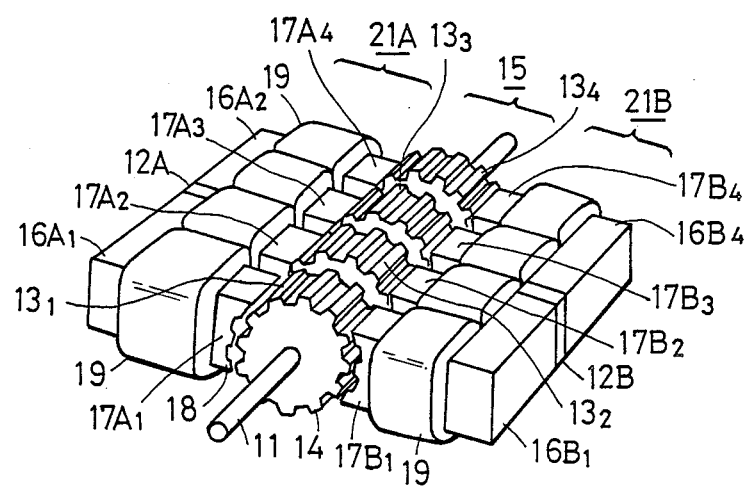
FIG. 4 is a perspective view illustrating an example of a four-phase hybrid type pulse motor embodying the present invention.
Figure 5:
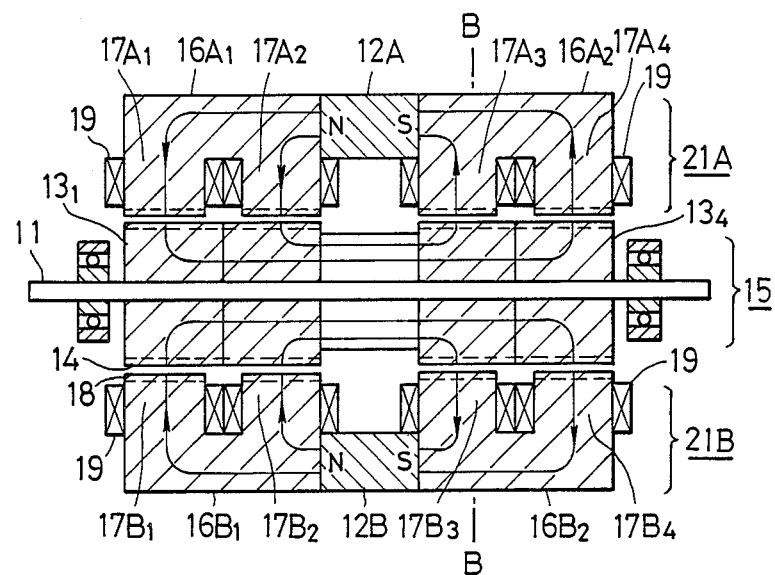
FIG. 5 is a sectional view of FIG. 4, including stators shown therein.
Figure 6:
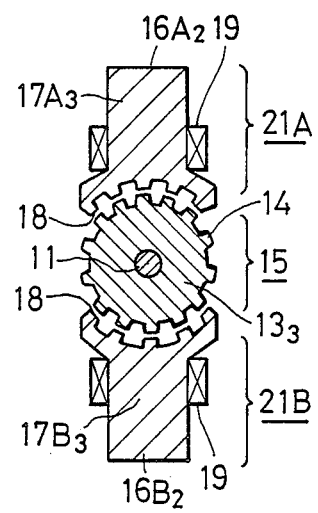
FIG. 6 is a sectional view taken on the line B—B in FIG. 5.

In FIGS. 4 to 6 there is illustrated an embodiment of the present invention as being applied to a four-phase hybrid type pulse motor. Rotor cores $13_1$, $13_2$, $13_3$ and $13_4$ are mounted on the rotary shaft 11 and affixed thereto. In FIG. 4 the rotor cores $13_1$ to $13_4$ are shown to be slightly spaced apart in the interests of clarity, but in practice they are each held in contact with the adjacent cores as shown in FIG. 5. The rotor cores $13_1$ to $13_4$ have the teeth 14 formed in their peripheral surfaces at the same pitch in their circumferential direction and the teeth 14 of the respective rotor cores are displaced one-fourth of the pitch apart from one another. For example, the teeth 14 of the rotor cores $13_2$, $13_3$ and $13_4$ are displaced apart in the same direction from the teeth 14 of the rotor core $13_1$ by two-fourths, one-fourth and three-fourths of the pitch, respectively. The rotary shaft 11 and the rotor cores $13_1$ to $13_4$ constitute the rotor 15. Incidentally, the teeth 14 of the rotor cores $13_2$, $13_3$ and $13_4$ may also be displaced apart in the same direction from the teeth 14 of the rotor core $13_1$ by two-fourths, three-fourths and one-fourth of the pitch, respectively.

Stators 21A and 21B are disposed on both sides of the rotor 15 in a plane that includes rotary shaft 11, to form a flat arrangement as shown in FIG. 4. The stator 21A has flat surfaced magnetic poles $17A_1$, $17A_2$, $17A_3$ and $17A_4$ and one end face of each of the magnetic poles $17A_1$, $17A_2$, $17A_3$ and $17A_4$ is opposite the peripheral surface of one of the rotor cores $13_1$, $13_2$, $13_3$ and $13_4$ and has the teeth 18 formed therein at the same angular pitch as that of the teeth 14. The magnetic poles $17A_1$ and $17A_2$ have at their other ends a flat stator yoke $16A_1$ coupled thereto and the magnetic poles $17A_3$ and $17A_4$ have at their other ends a flat stator yoke $16A_2$ coupled thereto. Disposed between a flat-surfaced stator yokes $16A_1$ and $16A_2$ is a permanent magnet 12A magnetized in the axial direction of the rotary shaft 11. The magnetic poles $17A_1$, $17A_2$, $17A_3$ and $17A_4$ each have the coil 19 would thereon.

Similarly the stator 21B has flat surfaced magnetic poles $17B_1$, $17B_2$, $17B_3$ and $17B_4$ and one end face of each of the magnetic poles $17B_1$, $17B_2$, $17B_3$ and $17B_4$ is opposite the peripheral surface of one of the rotor cores $13_1$, $13_2$, $13_3$ and $13_4$ and has the teeth 18 formed therein at the same pitch as that of the teeth 14. The magnetic poles $17B_1$ and $17B_2$ have at their other ends a flat yoke $16B_1$ coupled thereto and the magnetic poles $17B_3$ and $17B_4$ have at their other ends a flat stator yoke $16B_2$ coupled thereto. Between the stator yokes $16B_1$ and $16B_2$ a permanent magnet 12B is disposed which is magnetized in the axial direction of the rotary shaft 11. The magnetic poles $17B_1$, $17B_2$, $17B_3$ and $17B_4$ each have a flat-surface coil 19 wound thereon. The teeth 18 of both stators 21A and 21B are not disposed apart in pitch but are arranged at the same angular positions. In FIGS. 4 through 6 the motor housing is omitted.

Figure 1:
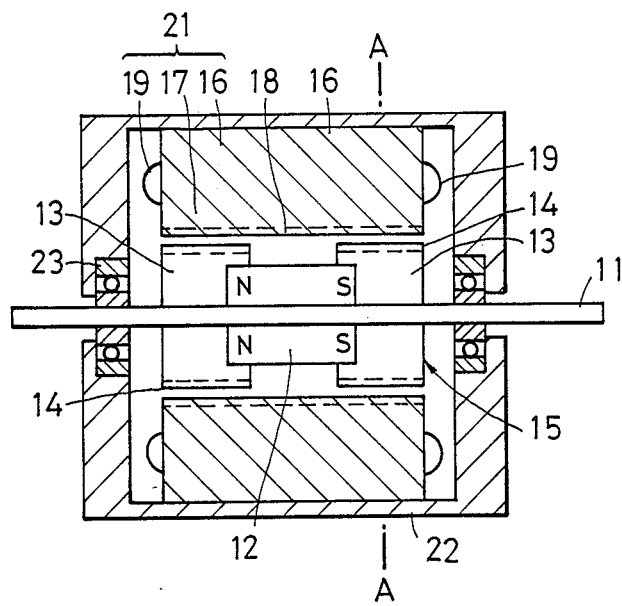
FIG. 1 is a sectional view showing a conventional four-phase hybrid type pulse motor.
Figure 2:
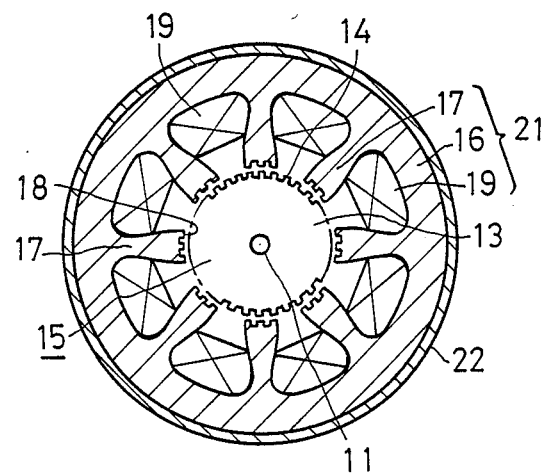
FIG. 2 is a sectional view taken on the line A—A in FIG. 1.
Figure 3:
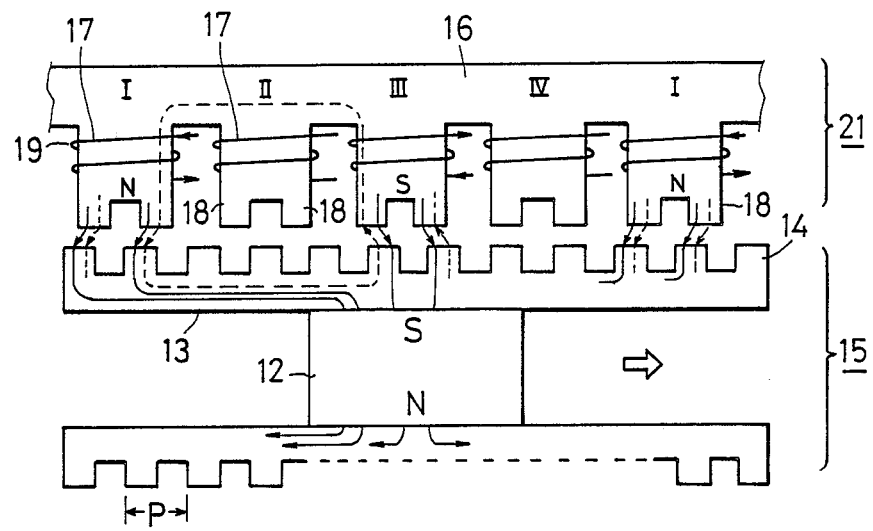
FIG. 3 is a development elevation, for explaining the operation of the conventional pulse motor.
Figure 7:
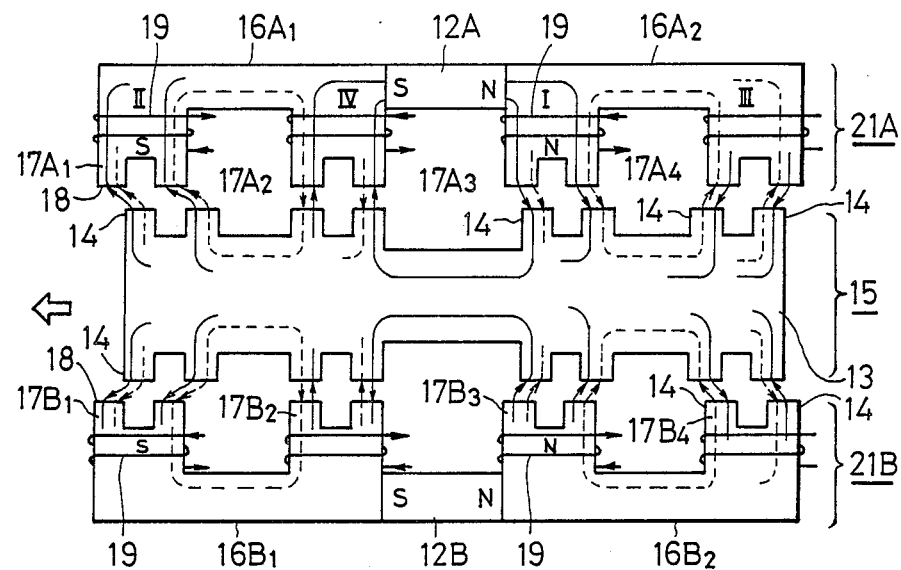
FIG. 7 is a development elevation, for explaining the operation of the motor depicted in FIG. 4.

To explain the operation of the pulse motor depicted in FIGS. 4 to 6, an equivalent development model is shown in FIG. 7. Since an attractive force acts between the magnetic poles $17A_1$, $17B_1$ and the rotor core $13_1$, since an attractive force similarly acts between the magnetic poles $17A_2$, $17B_2$ ($17A_3$, $17B_3$, $17A_4$, $17B_4$) and the rotor core $13_2$ ($13_3$, $13_4$), and since the rotor cores $13_1$ to $13_4$ are formed as a unitary structure through the rotary shaft 11, the rotors $13_1$ to $13_4$ can be arranged in a line as shown in FIG. 7. In FIG. 7 Greek numerals I, II, III and IV are the phase numbers as in FIG. 3. In the state shown in FIG. 7, when current flows in each of the coils 19 of the phase numbers I and II in the direction indicated by the arrows, the magnetic poles $17A_1$ to $17A_4$ and $17B_1$ to $17B_4$ are magnetized with the polarities indicated in FIG. 7. Then, magnetic fluxes emanating from the permanent magnets 12A and 12B and the coils 19 flow between the teeth 14 of the rotor core 13 and the teeth 18 of the stator 21 (21A, 21B) as indicated by the solid lines and the broken lines. In consequence, as described previously in respect to FIG. 3, a driving torque is generated by the attractive force between the teeth 14 of the rotor cores 13 of the phase numbers I and II and the teeth 18 of the stators 21A and 21B, by which the rotor 15 is turned by one-fourth of the pitch of the teeth 14. Thereafter, by repeatedly exciting the coils 19 of the respective phase numbers in the order of II and III, III and IV, IV and I, I and II, . . . the rotor 15 can be continuously driven by steps of one-fourth of the pitch of the teeth. The above is the case of two-phase excitation, and one-phase excitation can be achieved by driving first the coil 19 of the phase number I in the state of FIG. 7 and then the coils in the order of II, III, IV, I, . . . .

Figure 8:
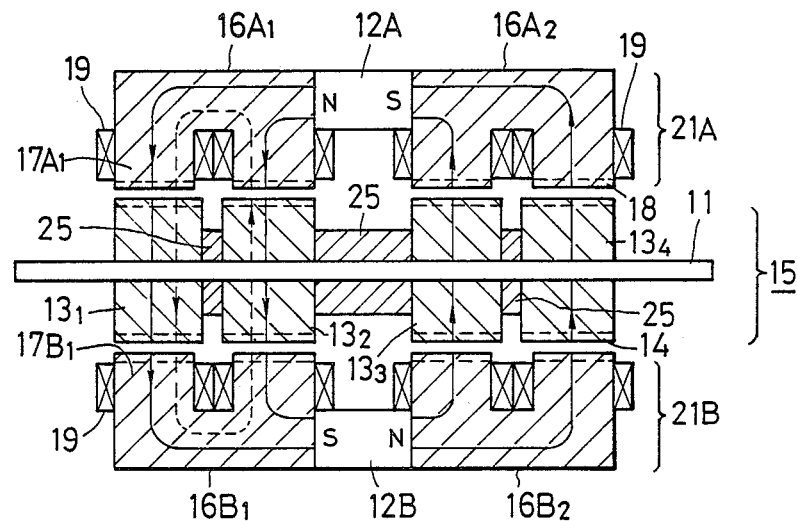
FIG. 8 is a sectional view, similar to FIG. 5, illustrating another embodiment of the present invention.

While in the above description the path of the magnetic flux emanating from the permanent magnet 12A is formed by the stator 21A and the rotor 15 and the path of the magnetic flux from the permanent magnet 12B is formed by the stator 21B and the rotor 15, the permanent magnets 12A and 12B may also be inserted in series in a closed magnetic path passing through the stators 21A and 21B and the rotor 15, as shown in FIG. 8. In this instance, the permanent magnets 12A and 12B are inserted in opposite direction with respect to the axial direction of the rotary shaft 11, the rotor cores $13_1$, $13_2$, $13_3$ and $13_4$ are spaced apart, and if necessary, spacers 25 of a non-magnetic substance are interposed between them. The arrangements of stator yokes $16A_1$, $16A_2$, $16B_1$, $16B_2$, magnetic poles $17A_1$ through $17A_4$ and $17B_1$ through $17B_4$ with teeth 18, rotor cores $13_1$ through $13_4$ with teeth 14, and coils 19 not specifically explained are substantially identical to those of the embodiment shown in FIGS. 4–6. According to the embodiment of FIG. 8, in a certain state of exciting the coils, the magnetic fluxes from the coils 19 of the magnetic poles $17A_1$ and $17B_1$, for example, are added together and pass through a closed magnetic path formed by the rotor 15 and the stators 21A and 21B, as indicated by the broken line in FIG. 8.

Figure 9:
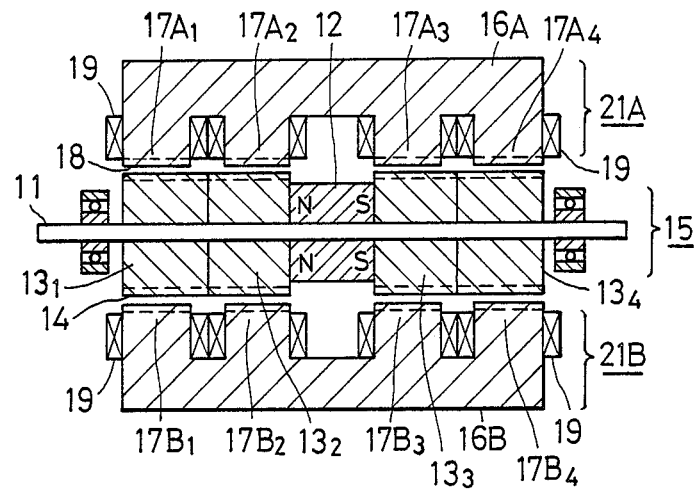
FIG. 9 is a sectional view, similar to FIG. 5, illustrating another embodiment of the present invention in which a permanent magnet is disposed on the rotor side.

In the above description the permanent magnets 12A and 12B are provided on the stators 21A and 21B, but they may also be disposed on the rotor 15 as shown in FIG. 9 in which the parts corresponding to those in FIG. 5 are identified by the same reference numerals. The permanent magnet 12 is interposed between the rotor cores $13_2$ and $13_3$ and affixed to the rotary shaft 11, the permanent magnet 12 being magnetized in the axial direction of the rotary shaft. The magnetic poles $17A_1$ to 17A$_4$ are coupled to the stator yoke 16A on the side opposite from the rotor 15 and the magnetic poles 17B$_1$ to 17B$_4$ are similarly coupled to the stator yoke 16B on the opposite side from the rotor 15. The arrangements of magnetic poles 17A$_1$ through 17A$_4$ and 17B$_1$ through 17B$_4$ with teeth 18, rotor cores 13$_1$ through 13$_4$ with teeth 14, and coils 19 but specifically explained are substantially identical to those of the embodiment shown in FIGS. 4–6. It will easily be understood that this pulse motor is exactly identical in operation with the motor depicted in FIG. 7.

Figure 10:
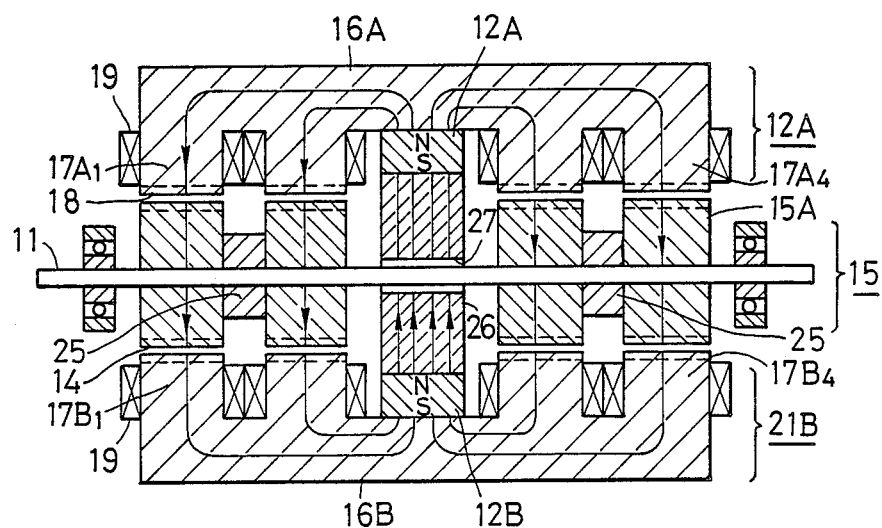
FIG. 10 is a sectional view illustrating still another embodiment of the present invention in which permanent magnets are disposed on the stator side, with their magnetic poles held perpendicular to the rotor shaft.

Although in the above-described examples the permanent magnet 12 (12A, 12B) is disposed with its magnetic poles held in parallel to the rotor shaft 11, they may also be disposed with the magnetic poles at right angles to the rotor shaft, as shown in FIG. 10. This example is a modification of the FIG. 8 embodiment, in which different magnetic poles (N, S) of the permanent magnets 12A and 12B are connected to the stator yokes 16A and 16B, respectively, and the other magnetic poles (S, N) are interconnected via a yoke 26. Accordingly, the magnetic poles of the permanent magnets 12A and 12B are connected in series via the yoke 26. The yoke 26 has a through hole 27 of a diameter greater than that of the rotor shaft 11 and has received therein the shaft 11. The arrangements of magnetic poles 17A$_1$ through 17A$_4$ and 17B$_1$ through 17B$_4$ with teeth 18, rotor cores 13$_1$ through 13$_4$ with teeth 14, and coils 19 not specifically explained are substantially identical to those of the embodiment shown in FIGS. 4–6. This pulse motor is identical in the principle of operation with the pulse motor depicted in FIG. 7. As is evident from FIG. 10, the series connection of the two permanent magnets 12A and 12B and the yoke 26 may also be replaced by one permanent magnet (not shown) having a through hole similar to hole one 27.

Although in the above embodiments the teeth 14 of the respective rotor cores 13$_1$ to 13$_4$ are displaced in phase (i.e. in angular position) from one another, it is also possible to employ an arrangement in which the teeth of the respective rotor cores 13$_1$ to 13$_4$ are in phase with the teeth of the other rotor cores but instead the teeth 18 of the respective magnetic poles 17A$_1$ to 17A$_4$ of the stators 21A and 21B are displaced in phase from one another. It will easily be understood that in the motor structures shown in FIGS. 5 and 9 the rotor cores 13$_1$ and 13$_2$, 13$_3$ and 13$_4$ may be formed as unitary structures, respectively, and one of the stators 21A and 21B may be omitted. Moreover, in the structures depicted in FIGS. 8 and 10 one of the stators 21A and 21B may be formed by a mere stator yoke alone.

In the structure shown in FIG. 5 an axially magnetized permanent magnet may also be interposed between the rotor cores 13$_2$ and 13$_3$, in which case the permanent magnet is magnetized to form a closed magnetic path in series with each of the permanent magnets 12A and 12B.

While the above embodiments have been described to have four magnetic poles, in general the number of magnetic poles may be selected to be 2n (where n is an integer equal to or greater than 2). In order to prevent the torques produced at the respective magnetic poles of the stator differing with the distance from the permanent magnet to the magnetic poles, the number of turns of the coil would on each magnetic pole, the cross-sectional area of the magnetic pole, the resistance value of the coil, or a combination thereof may be suitably selected to thereby ensure the production of the same torque at each of the magnetic poles. This will be effective especially when the number of magnetic poles involved is large. The resistance value of each coil can easily be changed simply by connecting thereto a resistor.

As described above, according to the present invention, since no stator is present in a direction perpendicular to the direction of arrangement of the rotor 15 and the stator 21A (21B), the thickness of the motor in this direction can be reduced to, for instance, about one-fourth of the thickness of the conventional motor. Further, since the rotor is extended in the axial direction and hence the teeth 14 and 18 can be formed relatively long, a relatively large torque can be obtained. Moreover, since each rotor core needs only to assume a single phase, the rotor may be small in diameter, and consequently it has a small moment of inertia and can be used in a high-frequency region as well.

I claim:
1. A thin pulse motor comprising:
   a rotary shaft;
   an array of 2n columnar rotor cores of a soft magnetic material mounted side by side on said rotary shaft in its axial direction, where n is an integer equal to or greater than 2, each of said columnar rotor cores having teeth formed in its peripheral surface at a fixed pitch;
   a first flat stator including: a first array of 2n flat magnetic poles arranged side by side in said axial direction, each of said magnetic poles of said first array having flat surfaces parallel to said rotary shaft, and each of said magnetic poles of said first array being disposed opposite a portion of the peripheral surface of a corresponding one of said columnar rotor cores and having a flat-surfaced coil wound thereon; and first flat yoke means for magnetically coupling together at least n of said flat magnetic poles of said first array from one end thereof and for magnetically coupling together at least the remaining ones of said 2n flat magnetic poles of said first array, said 2n magnetic poles of said first array having teeth formed in end faces thereof facing said 2n columnar rotor cores at the same angular pitch as that of said teeth of said columnar rotor cores;
   permanent magnet means fixedly mounted at a location selected from the group consisting of said first yoke means and said rotary shaft between the nth and (n+1)th ones of the columnar rotor cores in said columnar rotor core array; and
   a second flat stator disposed opposite said first stator across said 2n columnar rotor cores, said second stator including: a second array of 2n flat magnetic poles arranged side by side in said axial direction, each of said magnetic poles of said second array having flat surfaces parallel to said rotary shaft, and each of said magnetic poles of said second array being disposed opposite another portion of the peripheral surface of a corresponding one of said 2n columnar rotor cores and having a flat-surfaces coil wound thereon; and said second flat yoke means for magnetically coupling together at least n of said magnetic poles of said second array and for magnetically coupling together at least the remaining ones of said magnetic poles of said second array; said 2n magnetic poles of said second array having teeth formed in end faces thereof facing said 2n columnar rotor cores at the same angular pitch as that of the teeth of said 2n magnetic poles of said first array; said rotary shaft, said first and second flat yoke means, and said first and second arrays of flat magnetic poles all being disposed in a flat arrangement in a plane which includes said rotary shaft; and the relative angular positions of said teeth of said 2n columnar rotor cores and the teeth of said 2n flat magnetic poles of each of said first and second arrays being displaced 0, $\frac{1}{2}$n, 2/2n, . . . , and (2n−1)/2n times apart from one of said 2n columnar rotor cores.

2. A pulse motor according to claim 1 wherein said permanent magnet means comprises first and second permanent magnets inserted in said first and second flat yoke means centrally thereof in said axial direction and magnetized in the same direction in said axial direction, whereby said 2n columnar rotor cores are sequentially coupled magnetically.

3. A pulse motor according to claim 2 wherein said 2n columnar rotor cores are separate of one another.

4. A pulse motor according to claim 1 wherein said permanent magnet means comprises first and second permanent magnets inserted in said first and second flat yoke means centrally thereof in said axial direction and magnetized in opposite directions in said axial direction, and said 2n columnar rotor cores are spaced apart by spacers.

5. A pulse motor according to claim 1 wherein said permanent magnet means couples said first and second flat yoke means centrally thereof in said axial direction and is magnetized in a direction perpendicular to said axial direction, and said 2n columnar rotor cores are spaced apart by spacers.

6. A pulse motor according to claim 1 wherein said permanent magnet means is disposed between the n-th and (n+1)th ones of said 2n columnar rotor cores and magnetized in said axial direction.

7. A pulse motor according to claim 6 wherein the first to n-th ones of said 2n columnar rotor cores are formed as a unitary structure, the (n+1)th to 2n-th ones of said 2n columnar rotor cores are formed as a unitary structure, said first flat yoke means is magnetically coupled to all of said 2n flat magnetic poles of said first array in common thereto, and said second flat yoke means is magnetically coupled to all of said 2n flat poles of said second array in common thereto.

8. A pulse motor according to claim 6 wherein said 2n columnar rotor cores are formed separately of one another, said first flat yoke means is magnetically coupled to all of said 2n flat magnetic poles of said first array in common thereto, and said second flat yoke means is magnetically coupled to all of said 2n flat magnetic poles of said second array in common thereto.

9. A pulse motor according to any one of claims 1 to 8 wherein the numbers of turns of said coils respectively wound on said 2n flat magnetic poles of each of said first and second arrays differ with the distances thereto from said permanent magnet means.

10. A pulse motor according to any one of claims 1 to 8 wherein the cross-sectional areas of said 2n flat magnetic poles of each of said first and second arrays differ with the distances thereto from said permanent magnet means.

11. A pulse motor according to any one of claims 1 to 8 wherein the resistance values of said coils respectively wound on said 2n flat magnetic poles of each of said first and second arrays differ with the distances thereto from said permanent magnet means.

12. A pulse motor according to any one of claims 1 to 8 wherein n is 2, whereby said pulse motor has first, second, third and fourth columnar rotor cores and first, second, third and fourth flat magnetic poles in each of said first and second arrays.

13. A pulse motor according to claim 12 wherein the third, second and fourth ones of said magnetic poles from one end of each of said first and second arrays are sequentially displaced one-fourth the pitch of the teeth of said columnar rotor cores in the same direction relative to the first one of said magnetic poles at said one end.

14. A pulse motor according to claim 12 wherein the third, fourth and second ones of said magnetic poles from one end of each of said first and second arrays are sequentially displaced one-fourth the pitch of the teeth of said columnar rotor cores in the same direction relative to the first one of said magnetic poles at said one end.

15. A pulse motor according to claim 12 wherein said four columnar rotor cores are disposed with the teeth of the third, second and fourth ones of said columnar rotor cores from one end of said columnar rotor core array being sequentially displaced one-fourth the pitch of the teeth in the same direction relative to the first one of said columnar rotor cores at said one end.

16. A pulse motor according to claim 12 wherein said four columnar rotor cores are disposed with the teeth of the third, fourth and second ones of said columnar rotor cores of the array from one end thereof being sequentially displaced one-fourth the pitch of the teeth in the same direction relative to the first one of said columnar rotor cores at said one end.

* * * * *